(12) United States Patent
Street

(10) Patent No.: US 6,992,623 B2
(45) Date of Patent: Jan. 31, 2006

(54) 406 MHZ EMERGENCY BEACON WITH IN-BAND HOMING TRANSMITTER

(75) Inventor: William A. Street, Kelowna (CA)

(73) Assignee: Jodanti Enterprises Ltd., Kelowna (CA)

( * ) Notice: Subject to any disclaimer, the term of this patent is extended or adjusted under 35 U.S.C. 154(b) by 0 days.

(21) Appl. No.: 10/996,391

(22) Filed: Nov. 26, 2004

(65) Prior Publication Data

US 2005/0073458 A1    Apr. 7, 2005

Related U.S. Application Data

(63) Continuation-in-part of application No. 10/608,181, filed on Jun. 30, 2003, now abandoned.

(60) Provisional application No. 60/422,894, filed on Nov. 1, 2002.

(51) Int. Cl.
*G01S 1/00* (2006.01)
*G01S 1/08* (2006.01)

(52) U.S. Cl. .................. 342/385; 342/386

(58) Field of Classification Search ................ 342/385, 342/386
See application file for complete search history.

(56) References Cited

U.S. PATENT DOCUMENTS 5,218,366 A    6/1993    Cardamone et al.

*Primary Examiner*—Thomas H. Tarcza
*Assistant Examiner*—F H Mull
(74) *Attorney, Agent, or Firm*—Anthony C. Edwards

(57) ABSTRACT

A search and rescue beacon includes a main transmitter transmitting a Cospas-Sarsat signal at a main frequency and an auxiliary homing transmitter transmitting a homing signal at a homing frequency close to the main frequency. Advantageously both the Cospas-Sarsat signal and the homing signal are generated by a single synthesizer switching between a main Cospas-Sarsat burst transmission and a continuous homing frequency transmission of the homing signal. The Cospas-Sarsat signal is advantageously transmitted at a higher power than the homing signal. The single synthesizer may use a single amplifier chain. The single synthesizer and amplifier chain may use a single antenna.

20 Claims, 1 Drawing Sheet

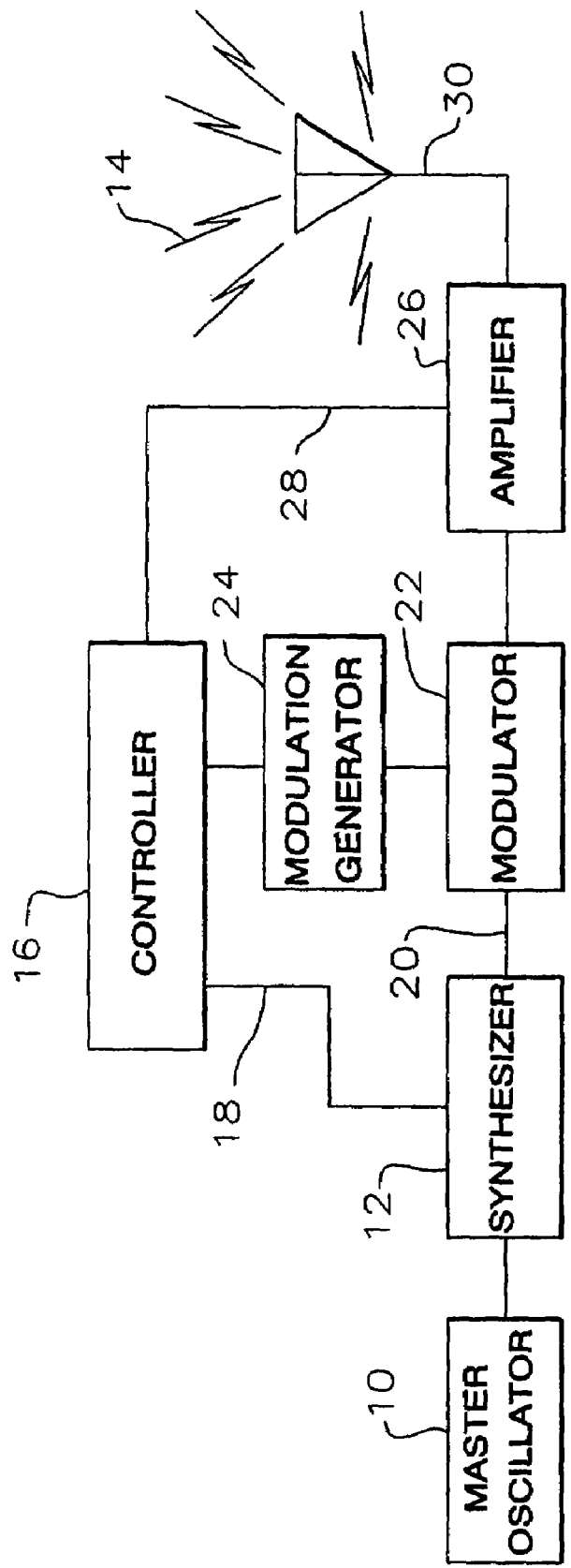

406 MHZ EMERGENCY BEACON WITH IN-BAND HOMING TRANSMITTER

CROSS REFERENCE TO RELATED APPLICATION

This application is a Continuation-in-Part of U.S. patent application Ser. No. 10/608,181 filed Jun. 30, 2003 now abandoned, which claims priority from U.S. Provisional Patent Application No. 60/422,894 filed Nov. 1, 2002 entitled 406 MHz Emergency Beacon with In-Band Homing Transmitter.

FIELD OF THE INVENTION

An emergency beacon is provided that incorporates an auxiliary transmitter, which is very close in frequency to 406 MHz, for use as a homing signal.

BACKGROUND OF THE INVENTION

Emergency beacons operating at 406 MHz have seen worldwide acceptance over the past decade or so. The 406 MHz beacon population is over 250,000, and the Cospas-Sarsat (C-S) satellites and system infrastructure have seen significant improvements over the years. The C-S system is likely to be around for a long time. However, reference to C-S herein is intended to encompass any similar system which may replace the present C-S system within the term of this patent.

Although C-S requirements only addresses the 406 MHz portion of the beacons, most national authorities require the use of an auxiliary 121.5 MHz, low power, homing transmitter in all beacons. Prior to 406 MHz technology becoming widely available, 121.5 MHz-only beacons were used. The 121.5 MHz-only beacons are being phased out. Recently C-S decided to terminate the satellite processing of 121/243 MHz signals based on recommendations from the International Maritime Organization (IMO) and the International Civil Aviation Organization (ICAO). This means that existing 121.5 MHz-only beacon users have to switch to a 406 MHz beacon.

Currently, to the best of applicant's knowledge all 406 MHz beacons have a 121.5 MHz transmitter that is used as a homing signal for aiding search and rescue (SAR) aircraft for homing the last few kilometres into the beacon. Technical problems, such as set out below, experienced during development of these beacons have mostly been overcome, but the developments have added cost and complexity to the beacon. Operational problems, such as when a user decides to hold his emergency position indicating radio beacon (EPIRB) instead of allowing it to float, still cause problems.

When an activated EPIRB is held by a survivor in a life raft, the transmitted signal may be attenuated significantly enough to preclude reception by the SAR airplane or helicopter. This defeats the purpose of having a homing signal in the beacon. The problem arises from the fact that most EPIRBs have an antenna that is optimized for 406 MHz operation, thus resulting in an electrically short antenna at 121.5 MHz which is very narrowband and very dependent on the water, which is acting as the antenna's ground plane, for proper radiation characteristics. When it is operated out of the water, the antenna is detuned (presenting a severe mismatch to the output power amplifier) and the ground plane effect is removed resulting in a reduction in the radiated signal. As beacons have become physically smaller over the years, this problem has been made worse. The 121.5 MHz homing transmitter in 406 beacons has been the cause of many problems. Such problems range from designing to meet the multitude of stringent signal parameters to the generation of harmonics causing interference problems in location protocol beacons. In the case of emergency locator transmitters (ELTs), energy from the aircraft VHF radio would be rectified in the unpowered ELT's 121.5 MHz output stage and produce an interfering signal for the aircraft's global positioning system (GPS) receiver. Overcoming these problems has added cost and complexity to 406 beacons. Problems have plagued 121.5 MHz beacons even long before the introduction of the superior 406 MHz technology.

SUMMARY OF THE INVENTION

This invention provides a SAR beacon with a homing transmitter transmitting at a frequency close to the frequency of the main C-S signal. Both signals are generated by a single synthesizer switching between the main C-S burst transmission and the continuous homing frequency transmission close in frequency. This will alleviate many of the technical issues and operation issues that the 121.5 MHz transmitters have caused.

Homing equipment operating at 406 MHz is not new; however, it is not practical because of the burst mode transmission characteristic of the C-S signal in all 406 beacons.

Replacing the 121.5 MHz homing transmitter with a homing signal close to the main frequency, for example 406 MHz, would result in:

1. reducing the cost of 406 MHz beacons;
2. eliminating the need for a second transmitter;
3. eliminating the need for a dual frequency diplexer;
4. eliminating the need to match to an electrically short antenna;
5. reducing the problems currently experienced when users hold their EPIRBs;
6. reducing RF interference problems in location protocol beacons; and,
7. reducing L band interference generated when using aviation radios.

Using the example of 406 MHz, and in order to establish what may, in one embodiment not intended to be limiting, be considered as an example of what is close to the main frequency of 406 MHz, 16% is used as the homing frequency limits because the typical frequency bandwidth of a monopole antenna is 16%. Sixteen percent of 406 MHz is 65 MHz, therefore in this example the lower frequency of the homing transmitter is 473.5 MHz (406−32.5) and the upper frequency of the homing transmitter is 438.5 MHz (406+32.5).

In summary, the search and rescue beacon according to the present invention may be characterized as including a main transmitter transmitting a Cospas-Sarsat signal at a main frequency and an auxiliary homing transmitter transmitting a homing signal at a homing frequency close to the main frequency wherein the limits of the homing frequency correspond substantially to a frequency bandwidth of the antenna, for example sixteen percent, that is, substantially plus or minus 8% on either side of the main frequency in the case of a monopole antenna. Advantageously both the Cospas-Sarsat signal and the homing signal are generated by a single synthesizer switching between a main Cospas-Sarsat burst transmission and a continuous homing frequency transmission of the homing signal. The Cospas-Sarsat signal is advantageously transmitted at a higher power than the homing signal. The single synthesizer may use a single amplifier chain. The single synthesizer and amplifier chain may use a single antenna.

In one embodiment, the main frequency is 406 MHz and the homing frequency is dedicated in a lower part or in an upper part of a 406–406.1 MHz frequency band.

BRIEF DESCRIPTION OF THE DRAWINGS

The FIGURE is a schematic illustration of the present invention.

DETAILED DESCRIPTION OF EMBODIMENTS OF THE INVENTION

The present invention is an emergency beacon that uses a homing transmitter that is close in frequency to the 406 MHz used by the international COSPAS-SARSAT (C-S) satellite system for search and rescue. The emergency beacon may be an Emergency Position Indicating Radio Beacon (EPIRB), an Emergency Locator Transmitter (ELT), or a Personal Locator Beacon (PLB) or any combination of these, or any other beacon that utilizes the C-S satellite system.

Conventionally the main 406 MHz C-S signal is a medium power burst transmission. Each transmission has a duration of approximately half a second and occurs approximately every 50 seconds. The homing signal is transmitted continuously except during the C-S signal transmission. In the present invention the homing signal is a low power signal that is close to 406 MHz, for example using the lower or upper part of the 406–406.1 MHz band for a dedicated homing frequency. The C-S signal and the homing signal efficiently use the same synthesizer, antenna, and amplifier chain with slightly different biasing. Using a low cost synthesizer, the transmitter frequency can be shifted between the C-S main signal and the homing signal very easily and with great accuracy. It is intended to be within the scope of this invention that the SAR C-S frequency may be other than 406 MHz and that the homing signal frequency may be other than in the 406–406.1 range so long as within the available bandwidth for a particular SAR C-S frequency.

As seen in the FIGURE, which is intended to illustrate merely one embodiment according to the present invention and not intending to be limiting, master oscillator 10 provides an oscillating signal to a single synthesizer 12. The single synthesizer 12 outputs a burst signal at the SAR C-S transmitter frequency (now-conventionally at 406.028 MHz), and, alternatingly, a continuous homing beacon signal, for example at 406.075 MHz, illustrated in the FIGURE as C-S/homing signal 14. A controller 16 provides the necessary control signals 18 to synthesizer 12 to select between the C-S frequency or the homing frequency. In the embodiment illustrated, the signal 20 from the synthesizer is modulated by a modulator 22 to insert information generated by the modulation generator 24 as required. The C-S signal is modulated by modulator 22 so as to include the signal information allowing each beacon to be uniquely identified. The homing signal is modulated as necessary such as swept tone audio, steady tone audio or no modulation at all to facilitate homing by a suitable receiver.

The modulated C-S signal or homing signal is amplified by amplifier stages 26. The controller 16 provides a control signal 28 to the amplifier chain to select medium power (for example 5 W) for use when the C-S signal is transmitted or low power (for example 50 mW) for use when the homing signal is transmitted. The C-S signal or homing signal is then transmitted by the antenna, illustrated by way of a monopole antenna 30, it being understood that the desired form of antenna may take a different form as would be known to one skilled in the art. In the case of the monopole antenna, and in the instance where the main frequency is substantially 406 MHz, the homing frequency bandwidth is approximately 65 MHz (that is, 16% of the main frequency) so that the homing frequency limits are approximately 373.5–438.5 MHz.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A search and rescue beacon comprising a main transmitter and transmitting a Cospas-Sarsat signal at a main antenna frequency and an auxiliary homing transmitter transmitting a homing signal at a homing frequency within a homing frequency bandwidth which is substantially equivalent to said a percentage multiplied by said main antenna frequency and wherein said homing frequency bandwidth is substantially centered on said main antenna frequency but is not coincident with said main frequency.

2. The beacon of claim 1 wherein both said Cospas-Sarsat signal and said homing signal are generated by a single synthesizer switching between a main Cospas-Sarsat burst transmission and a continuous homing frequency transmission of said homing signal.

3. The beacon of claim 2 wherein said main frequency is 406–406.1 MHz and said homing frequency bandwidth is sixteen percent of said main frequency.

4. The beacon of claim 3 wherein said homing frequency is dedicated in a lower part of a 406–406.1 MHz frequency band.

5. The beacon of claim 4 wherein said homing frequency bandwidth is substantially 65 MHz.

6. The beacon of claim 4 wherein said homing frequency is dedicated in an upper part of a 406–406.1 MHz frequency band.

7. The beacon of claim 6 wherein said homing frequency bandwidth is substantially 65 MHz.

8. The beacon of claim 4 wherein said homing frequency bandwidth is substantially 65 MHz.

9. The beacon of claim 2 wherein said single synthesizer uses a single amplifier chain.

10. The beacon of claim 9 wherein said single synthesizer and amplifier chain use a single antenna.

11. The beacon of claim 2 wherein said homing signal is transmitted at a lower power than said Cospas-Sarsat signal.

12. The beacon of claim 11 wherein said homing signal is transmitted at approximately 50 milli-watts.

13. The beacon of claim 1 wherein said main frequency is 406–406.1 MHz and said homing frequency bandwidth is sixteen percent of said main frequency.

14. The beacon of claim 13 wherein said homing frequency is dedicated in a lower part of a 406–406.1 MHz frequency band.

15. The beacon of claim 14 wherein said homing frequency bandwidth is substantially 65 MHz.

16. The beacon of claim 13 wherein said homing frequency is dedicated in an upper part of a 406–406.1 MHz frequency band.

17. The beacon of claim 16 wherein said homing frequency bandwidth is substantially 65 MHz.

18. The beacon of claim 13 wherein said homing frequency bandwidth is substantially 65 MHz.

19. The beacon of claim 1 wherein said homing signal is transmitted at a lower power than said Cospas-Sarsat signal.

20. The beacon of claim 19 wherein said homing signal is transmitted at approximately 50 milli-watts.

* * * * *